July 3, 1962  J. E. LINDBERG, JR  3,041,821
ACTUATOR EMPLOYING CERTAIN OXIDES THAT REVERSIBLY
ELABORATE AND TAKE UP OXYGEN
Original Filed Sept. 8, 1958

INVENTOR.
JOHN E. LINDBERG, JR.
BY
ATTORNEY

United States Patent Office 3,041,821
Patented July 3, 1962

3,041,821
ACTUATOR EMPLOYING CERTAIN OXIDES THAT REVERSIBLY ELABORATE AND TAKE UP OXYGEN
John E. Lindberg, Jr., 3296 Springhill Road, Lafayette, Calif.
Original application Sept. 8, 1958, Ser. No. 759,717. Divided and this application Sept. 13, 1960, Ser. No. 55,734
9 Claims. (Cl. 60—23)

This invention relates to improvements in method and apparatus for power transmission and actuation. It can be used to actuate any device capable of applying mechanical force, including hydraulic systems, gas turbines, loudspeakers, valve actuators, and the like. This application is a division of application Serial Number 759,717, filed September 8, 1958, now abandoned.

Conventional power transmission or actuator systems are generally bulky and excessively heavy. They consist of complex units whose overhaul and repair are expensive. The operation of many of them depends upon liquids or gases that must either be contained in rather large reservoirs to provide potential energy, and/or usually have to be circulated by pumps. In addition, many of these systems require close-fitting leakproof seals which are subject to failure at elevated temperatures. Often, various and sundry fittings, valves, and transmission lines are required as integral parts of the actuator unit.

Adequate power transmission systems are vital on modern aircraft, where they are used for retracting and lowering the landing gear, flap control, afterburner control and many other things. But the actuator systems heretofore available have proved inadequate in the high-temperature environment experienced by high-speed aircraft and by guided missiles. Consequently, major aircraft companies have been trying to develop 3000-p.s.i. actuator systems able to operate between —65° F. and 1000° F. For example, current research is directed toward development of hydraulic systems capable of operating in these environments, but performance data on hydraulic pumps indicate that, as yet, no dependable pump has been developed which will function properly over the full —65° F. to 1000° F. range. Even if there were such pumps, contemporary hydraulic fluids are, at best, able to perform satisfactorily only within the range of —100° F. to 700° F., while the seals that are necessary in a hydraulic system have a relatively short life at 700° F.

Moreover, hydraulic systems have many disadvantages, even if able to function properly. A pump external to the actuating system is necessary, as are hydraulic accumulators in some cases; high pressure fittings, control valves, and transmission lines must be installed as an integral part of the system, and these result in excessive bulk and weight. The fluids involved often constitute a fire hazard, and the system must be primed before operation. In addition, when it is necessary to replace a defective unit because of a breakdown, other parts of the system are often affected, resulting in expensive procedures.

One object of this invention is to provide an actuator (i.e., power-transmission) system capable of satisfactory operation at (1) elevated temperatures in the range of 800° F. and higher and at high pressures, as well as at (2) low temperatures and at low pressures. Another object is to provide an actuator that does not depend upon liquids of any kind. It achieves these objects by utilizing certain thermodynamic properties of certain special oxides to alter the internal pressure of a container in which they are enclosed, in accordance with the temperature of the materials.

The actuating systems described herein are relatively simple, compact, and economical as compared to conventional systems, and in addition do not depend upon the use of external pumps or reservoirs. Thereby, this invention achieves the objects of providing a compact, relatively inexpensive, simple, and economically operable actuator system.

A further aim of this invention is to provide actuating systems which do not employ valves, fittings, or fluid or vapor transmission lines, as do numerous present-day actuators, and which do not require priming operations.

Over and above eliminating many disadvantages of conventional actuating systems, as well as solving the problem of elevated temperature and pressure actuation, this invention presents a much smaller fire hazard than other contemporary systems, and will function with any source or sink of heat.

Other objects and advantages of the invention will appear from the following detailed description of some preferred embodiments thereof.

GENERAL PRINCIPLES OF THE INVENTION

Figure 1:
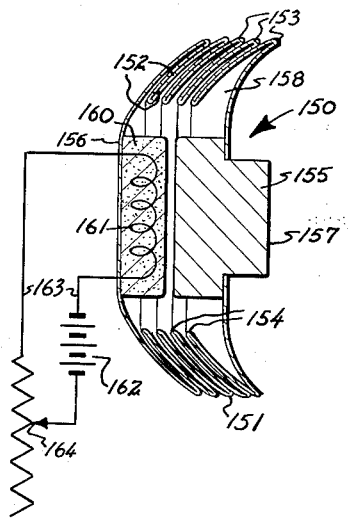
FIG. 1 is a view in side elevation and in section of an actuator embodying the principles of this invention and incorporating a single-unit cantilever bellows for control by temperature variation. The actuator is shown in its contracted or hot position, and an accompanying electrical circuit is indicated diagrammatically.

The principal phenomenon upon which my invention is based is the fact that certain oxides are capable of ingassing (taking in gas in either a chemical or physical action) upon the application of heat and of degassing (also called "out-gassing") upon the removal of heat. However, as will be seen, any of these ingassing or outgassing oxides, hereafter termed "gas-transfer agents" represents, under the right conditions, a very useful means for storing energy. Moreover, this energy may be converted to perform useful work whenever desired by varying the temperature or pressure conditions.

One way of utilizing this phenomenon is to enclose a gas-transfer agent in a container of variable dimensions so constructed that the dimensions always conform to equilibrium conditions, i.e., to a balance of the internal forces against the external forces. The application of heat to such an enclosed gas-transfer agent then results in the alteration of the internal pressure within the container due to the taking in of gas by the gas-transfer oxide, with the consequence that the container dimensions alter in order to maintain equilibrium. This dimensional alteration is accomplished by movement of some part of the container, and this movement can be used to "actuate" or cause movement of another device which will perform useful work.

There are at least three mechanisms by which gases or vapors may be taken up by a solid. (1) The solid may chemically react with the gas or vapor. (2) The solid may physically adsorb the gas; then the gas condenses as a layer on the surface of the solid. (3) The solid may physically absorb the gas; then gas enters into the interior of the solid in much the same manner as gas dissolving in a liquid. In many cases, the solid may taken up gas by both adsorption and absorption, and in many cases it is difficult to determine the exact nature of the mechanisms involved; so the generic term sorption and its derivatives sorptive, sorbent, etc., are used to include both or either of absorption and adsorption. With the oxides used in this invention, sorption and desorption of a gas or vapor is reversible and can be made to occur repetitively for an unlimited number of cycles.

For every sorptive condition of a mixture of the oxygen and the sorbant metal, at any one temperature, there is a certain pressure at which this mixture will be in thermodynamic equilibrium. When the gas is a thermodynamic phase of the sorbant substance, this pressure is often called the "equilibrium pressure"; when the gas is not necessarily native to the sorbing substance, this pressure is often called the "dissociation pressure"; however, I shall use the terms interchangeably. It is generally true that under equilibrium conditions a change in any one thermodynamic variable causes a change in the others. Thus, the equilibrium pressure may be varied by changing the temperature.

When oxygen is sorbed or goes into solution in the metals used in this invention, heat is absorbed in the reaction in an endothermic reaction. The heat absorbed is termed the "heat of solution."

It is difficult to distinguish between a solution of oxygen and a solution of oxides. However, the formation of true solutions has been determined in silver, copper, and cobalt. Examples of the solubility of oxygen in silver and copper are listed in Tables I and II.

Table I.—Solubility of Oxygen in Silver at 1 atm. Pressure

| T °C. | Cm.³/100 g. |
|---|---|
| 400 | 0.83 |
| 600 | 1.26 |
| 800 | 3.37 |

Table II.—Solubility of Oxygen in Copper at 1 atm. Pressure

| T °C. | Cm.³/100 g. |
|---|---|
| 600 | 5.0 |
| 800 | 6.6 |
| 1050 | 11.0 |

GENERAL APPLICATION OF THE OXIDES OF THIS INVENTION TO THE PROBLEM OF ACTUATION

My invention provides means for altering the internal pressure of any closed container. If the container has dimensions which are variable with internal pressure, then the resultant change of volume due to change in internal pressure can be utilized to activate a suitable device. The container of variable dimensions used in this manner thus becomes an actuator.

There are, as previously explained, many substances whose equilibrium gas or vapor content varies with temperature and pressure. In general, except for a few substances, the equilibrium pressure and temperature have a one-to-one correspondence. Hence, by inserting an oxygen-ingassed or degassed metal within a closed container, the internal pressure of the unit may be varied by the simple expedient of heating or cooling the gas-transfer agent.

An analytical expression has been developed for the purpose of calculating the change in volume of a container of variable dimensions resulting from changing the temperature of a specified amount of enclosed gas-transfer agent. The internal volume of the container is conveniently referred to as the "loading chamber." The equation, which may be referred to as "the loading-chamber equation" is:

$$\Delta V = \left[ d\Delta S_{P,T} + 1 - \frac{P_o T}{P T_o} \right] V_h - V_o \left[ 1 - \frac{P_o T}{P T_o} \right]$$

where $d$ is the density of unsaturated gas-transfer agent, in grams per cc.

$P_o$ is the initial pressure of the loading chamber, in atmospheres $T_o$ is the initial temperature of the loading chamber, in ° Kelvin $P$ is the final pressure of the loading chamber, in atmospheres $T$ is the final temperature of the loading chamber, in ° Kelvin $\Delta S_{P,T}$ is the change in gas or vapor content of the gas-transfer agent, in cc., when pressure and temperature are varied from $P_o$, $T_o$ to $P$, $T$ $V_o$ is the initial volume, in cc., of the loading chamber at pressure $P_o$ and temperature $T_o$ $V_h$ is the volume, in cc., of the gas-transfer agent in the loading chamber $V$ is the volume, in cc., of the loading chamber at pressure $P$ and temperature $T$ $\Delta V$ is $V - V_o$, which is the change in volume of the loading chamber, in cc.

It is understood that initially the gas-transfer agent (i.e., the oxide of copper, silver, or cobalt) in the loading chamber is surrounded by, and is in equilibrium with, either an inert gas or vapor, or with a gas or vapor of the same chemical composition as that contained in, or to be released by, the gas-transfer agent. Helium, argon, zenon, and neon are typical suitable inert gases.

Heat may be applied to the gas-transfer agent in many different ways. A direct current filament may be used; an A.C. current generator may be applied to a filament embedded in the agent; the gas-transfer agent may be heated by an inductive heating circuit consisting of a high frequency generator applied to an inductive heating coil which is either embedded in or surrounds the gas-transfer agent; the gas-transfer agent may be heated by a flame that warms heat-conducting walls of a container; or the gas-transfer agent may be heated by a solar concentrator having a lens which serves to focus rays from the sun upon a reflector and thence to the gas-transfer agent.

AN ACTUATOR WITH CANTILEVER-TYPE BELLOWS

An actuator 150 of variable dimensions, suitable for the employ of my invention and depicted in the drawings, employs what is called a cantilever-type bellows 151. The bellows 151 comprises several flat annular sheets 152 of suitable refractory material or fabric which are joined alternately on their outer periphery 153 and inner periphery 154, thus forming the flexible bellows. The bellows 151 can be sealed at both ends by end members 155, 156. The end member 156 may be stationary while at the other end the member 155 is free to move and may contact the member to be actuated (not shown). When the pressure inside loading chamber 158 is lowered by heating a gas-transfer agent 160 of the unit, as by a filament 161, battery 162, leads 163, and potentiometer 164, the device moves to its FIG. 1 position. When the internal pressure in the chamber 158 is increased by cooling, the bellows 151 expands to an equilibrium position shown in FIG. 2.

Figure 2:
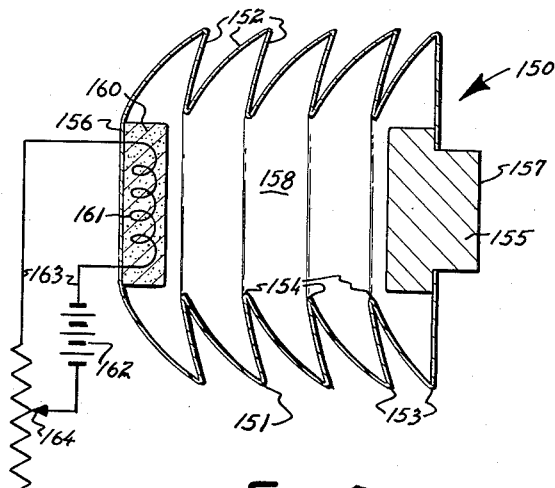
FIG. 2 is a view like FIG. 1 but shows the bellows in its extended or cool position.

As an example, consider the use of the reaction between silver and oxygen, for which the solubility as a function of temperature is shown in Table I. The solution of oxygen in silver in the range of temperature shown in the table is an endothermic reaction. Assume that in FIG. 2, 100 gms. of silver oxide is used as the gas-transfer agent 160 and that it is placed in the loading chamber 158 in equilibrium with oxygen at a temperature of 400° C. and a pressure of 1 atmosphere. The bellows 151 is in the expanded position as shown in FIG. 2.

If the oxide is now heated to 800° C., it may be seen by referring to Table I that 3.37−0.83=2.54 cm.³ of oxygen will be absorbed by the silver, assuming that the external pressure against the actuator 150 is one atmosphere. Then if the effective area of the actuator bellows 151 is 2 cm.², a contraction of $$L \frac{\Delta V}{A_{eff}} = \frac{2.54}{2} = 1.27 \text{ cm.}$$

of the bellows will result. The reaction between silver and oxygen is reversible so that if the temperature of the oxide is lowered to 400° C. again, the actuator 150 will expand to its initial position.

Cobalt and copper give similar reactions.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An actuator device, including in combination a container completely enclosing a volume; means to expand the volume of said container to balance the pressure in said volume with forces outside said container; a charge of material chosen from the group consisting of the oxides of silver, copper, and cobalt inside said container to give off gas when the temperature is lowered and to take in gas when the temperature is raised, reversibly; an excess charge of oxygen in said container when the temperature is lowered, said charge of oxygen being taken in by said material when said temperature is raised; and means to heat and cool said material so as to increase and decrease the pressure inside said container, the resultant expansion and contraction of said container being suitable for applying an actuating force to another device.

2. An actuator comprising a gas-tight bellows having a movable end; an oxide of metal chosen from the group consisting of cobalt, silver, and copper in said bellows, which changes the internal pressure thereof by emitting quantities of oxygen large in proportion to said oxide when the temperature of said oxide is lowered, and takes up oxygen when the temperature of said oxide is raised; an excess supply of oxygen also in said bellows; and means for heating said oxide.

3. An actuator device, including in combination: a sealed container; a charge of material chosen from the group consisting of the oxides of copper, silver, and cobalt inside said container; an excess charge of oxygen in said container; means for changing the temperature of said oxide at will to cause it to emit oxygen gas when cooled and take up oxygen gas when heated, as desired; and force-transmitting means actuated by the emission and taking up of said gas within said container.

4. The device of claim 3, wherein said container also contains a charge of inert gas.

5. The device of claim 3 wherein said means for changing the temperature of said charge comprises an electric heating element inside said container and a source of electric power outside said container and electrically connected to said element.

6. An actuator device, including in combination: a container completely enclosing a volume; means to expand the volume of said container to balance the pressure in said volume with forces outside said container; a gas-transfer agent inside said container and filling only a portion thereof, said gas-transfer agent comprising an oxide of metal chosen from the group consisting of cobalt, copper, and silver; an excess charge of oxygen filling said volume and holding said volume expanded at a cool temperature, at least some of said excess oxygen being taken up by said gas-transfer agent when said gas-transfer agent is heated, thereby reducing the pressure in said chamber; and means to vary the temperature of said gas-transfer agent so as to change the pressure inside said container, the change in the volume of said container being suitable for applying an actuating force to another device.

7. The device of claim 6 wherein an inert gas is provided in said container in addition to said oxygen.

8. A power-conversion and transmission device, including in combination: a gas-tight container having at least one wall that is movable so as to vary the volume of said container in response to variations in internal pressure; an oxide of metal chosen from the group consisting of silver, cobalt, and copper inside said container; an excess charge of oxygen inside said container; and means for changing the temperature of said oxide, so that it takes up oxygen when heated and emits oxygen when cooled, thereby varying the volume of said container.

9. An actuator comprising a gas-tight bellows having a movable end; an oxide chosen from the group consisting of copper, cobalt, and silver in said bellows, said oxide emitting oxygen when cooled and taking in oxygen when heated; an excess supply of oxygen in said bellows; an electrical heating filament in said oxide; a source of electrical power; and a circuit connecting said source to said filament.

References Cited in the file of this patent

UNITED STATES PATENTS

| | | |
|---|---|---|
| 1,159,893 | Browne et al. | Nov. 9, 1915 |
| 1,756,688 | Hutchinson | Apr. 29, 1930 |
| 1,819,588 | Bennett | Aug. 18, 1931 |
| 2,271,307 | Ray | Jan. 27, 1942 |
| 2,627,911 | McCarty | Feb. 10, 1953 |